Jan. 3, 1967     C. BOUTIN ET AL     3,296,086
MODERATOR CORE STRUCTURE FOR NUCLEAR REACTOR
Filed Dec. 21, 1964     9 Sheets-Sheet 7

3,296,086
MODERATOR CORE STRUCTURE FOR NUCLEAR REACTOR

Claude Boutin and Sebastien Foglia, Verrieres-le-Buisson, Georges Lemesle and Roger Martin, Paris, and Pierre Rouge, Gif-sur-Yvette, France, assignors to Commissariat a l'Energie Atomique, Paris, France
Filed Dec. 21, 1964, Ser. No. 421,751
Claims priority, application France, Mar. 22, 1962, 892,404; Feb. 22, 1963, 925,754
13 Claims. (Cl. 176—84)

This application for patent is a continuation-in-part of our application Serial No. 268,148, filed March 26, 1963, and now abandoned.

The object of the present invention is to provide a core structure for a solid moderator nuclear reactor.

In reactors of this type, the core comprises in general a moderator mass formed by an assembly of prismatic bars of moderator material having axial symmetry. In most cases these bars are assembled in an assembly of vertical adjacent columns each formed by a series of bars of identical cross-section located in end-to-end relation, the cohesion and stability of the assembly being ensured for example by a system of longitudinal keys of the kind described in Babule et al., Serial No. 846,080, filed October 13, 1959, and now Patent No. 3,157,852.

In prior art reactors, the active part of the core (so-called as opposed to the reflector forming part, in which no fission occurs) was often formed with parallel ducts the number of which was substantially equal to the number of columns; in these ducts the fuel elements were located and the cooling fluid was circulated in these ducts.

Usually, the bars forming each column were bored along their longitudinal axes in order that their super-positioning would define a duct extending along the length of a column; but the presence of the bore had the drawback of producing an appreciable loss of moderator material during manufacture from a solid bar and a loss of mechanical strength of the bars.

According to another prior art arrangement, the bars in each column were solid, but their lateral faces were formed with longitudinal recesses each forming an angular portion of a duct; the ducts appearing on assembly of the bars in columns and of adjacent columns, between them, presented axes parallel to the axes of the columns, either contained substantially in the longitudinal faces of the columns, or placed at the longitudinal edges of the columns.

The transverse dimensions of the bars are limited by considerations of manufacture and handling. In either of the preceding arrangements, the limitation of the dimensions of the bars implies a relative limitation of the diameter of the ducts and, for a given volume of voids, a number of ducts greater than that imposed by purely neutronic and thermal considerations. Now the number of complete sequences of reloading operations and the time required for them increases almost proportionally to the number of ducts for a given number of elements per duct. Further a supplementary problem arises in the case of a reactor enclosed in a vessel under pressure and reloaded by means of a machine placed outside the vessel; considerations of resistance of the materials sets a limit to the number of pipes set in the vessel to provide access to the ducts and hence the need to provide refueling devices for the fuel elements is much more complex when the number of ducts to be served is greater than one.

The object of the present invention is to provide a core structure for a solid moderator nuclear reactor in which moderator bars of classic dimensions may be used while substantially simplifying the problems of handling fuel by virtue of adopting a reduced number of ducts.

According to the invention there is provided a core structure for a solid moderator nuclear reactor comprising a plurality of identical prismatic assemblies disposed parallel to a common direction and presenting a right section perpendicular to the said direction so that the assemblies associate with one another, without residual spacing other than play, and having longitudinal keying means between the said assemblies parallel to said direction and arranged in at least two different orientations, characterized in that each of said assemblies comprises at least two coupled prismatic bars of moderator material having axes parallel to the said common direction, a nuclear fuel cell in a passage parallel to the said direction for circulation of a cooling fluid and key means extending parallel to the said direction, each fuel cell being located in its prismatic assembly and the prismatic assemblies being located relative to one another so that each fuel cell is surrounded only by solid bars of moderator material.

With regard to conventional dispositions, such an arrangement provides, for given transverse dimensions of the bars, a reduction in the number of ducts by a factor at least equal to two. The reduction in the number of ducts is necessarily accompanied by an increase in the pitch of the lattice of ducts, i.e., the distance between the axes of the ducts and consequently an increase in the mass of fuel in each duct. The increase of mass of fuel is obtained either by using a single column of fuel elements of large section and of geometry such that the temperature gradients remain admissible in the fuel material (elements of tubular form or of star-shaped cross-section for example), or by using a cluster in a single sheath of moderator material of several columns of fuel elements of conventional dimensions located in sub-ducts.

In the latter case, centering and angular orientation devices are provided to orientate the sheaths in the ducts to obtain alignment of the protions of sub-ducts belonging to different sheaths.

Among other interesting characteristics which provide advantages with respect to a classic structure making use of bars having bores forming the ducts, the following may be mentioned:

(1) The space available between ducts for a given transverse dimension of bars and a relative total section of the channels to a given section of moderator is substantially increased which enables:

(a) The use in the vessel of a standpipe opposite each channel and, in the case of a vessel of prestressed concrete, the orifices of the standpipes are sufficiently spaced to allow easy passage of stressing cables or of metallic sheathings;
(b) In the case of a loading structure located in a "garret"; reduction of the number of orifices provided in the slab separating the core from the "garret," which results in greater ease of construction, an increase of rigidity and a reduction in price;
(c) easy location of control rods along the axes of certain bars and of their winches or return devices of their control coupling.

(2) The duct lattice may be given an increased pitch (i.e. an increase in the distance between adjacent ducts) while using moderator blocks of conventional dimensions assembled by longitudinal keys and free from Wigner effect as compared to prior structures requiring blocks of large dimension.

(3) The resistance of the pile to transverse forces is increased due to the reduction in the number of keying grooves and in the loss of strength caused by the keying grooves.

(4) Loss of moderator material during manufacture is reduced by eliminating boring of the blocks of the moderator.

(5) The choice of fuel elements is improved; either classic elements assembled in clusters may be used, which avoids research, or elements of larger section may be used, for which the cost of research and manufacture is compensated for by the reduction of the number of components to be made.

(6) Recharging the reactor with fuel is performed in a smaller number of ducts, thus requiring a much smaller number of complete operating sequences, and risk of accident is reduced with reduction in the number of machines for replacing a given number of fuel elements.

The invention will be better understood from the following description of various embodiments of the invention, given by way of example only. The description refers to the accompanying drawings in which.

Figure 1:
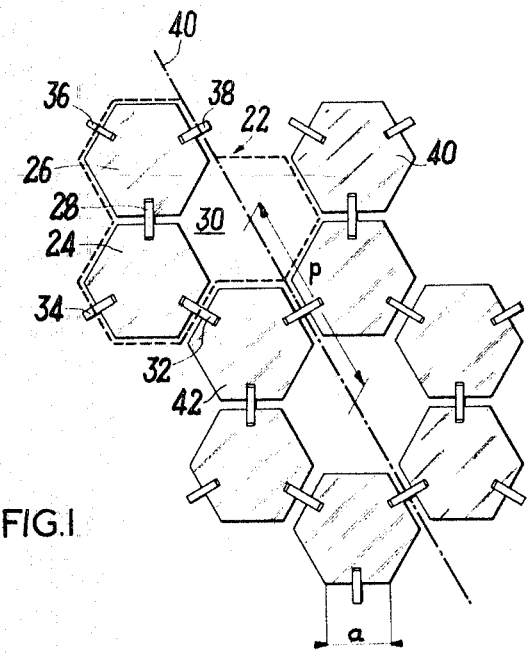
FIGURE 1 is a section, in a plane perpendicular to the axis of the moderator bars, of a core structure in which bars and ducts have right regular hexagonal sections of the same order.
Figure 4:
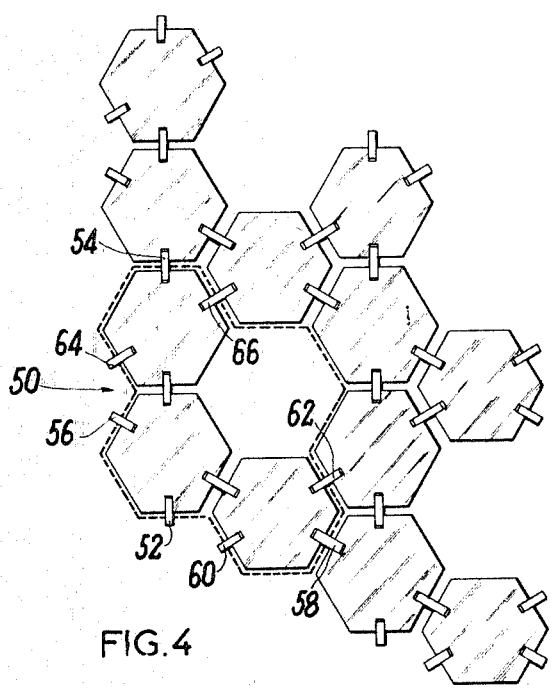
Figure 2:
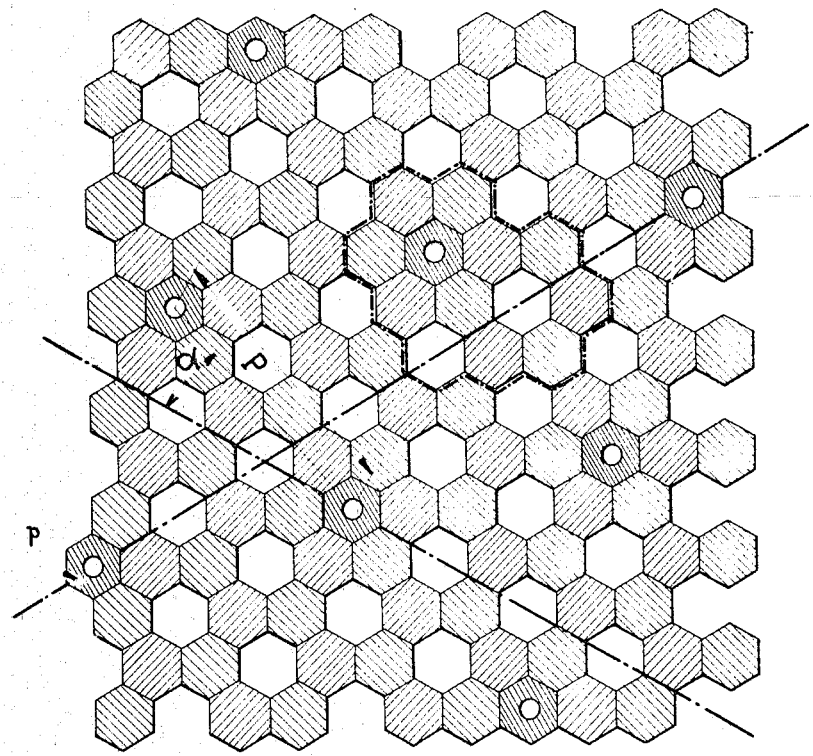
FIGURE 2 is very schematic partial view of a part of a structure which is variant of the embodiment of FIGURE 1.
Figure 3:
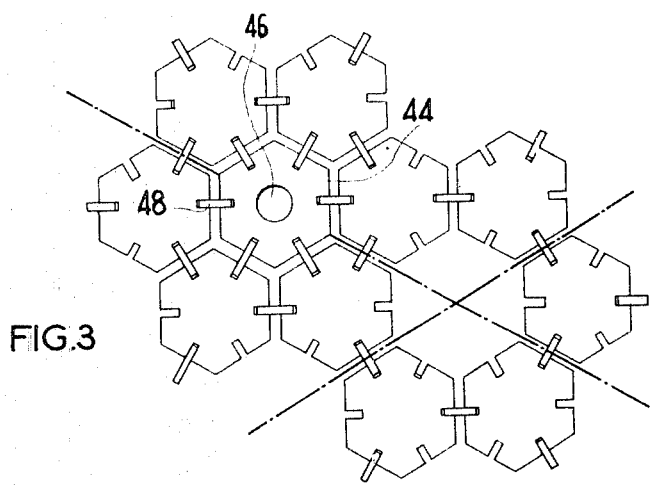
Figure 6:
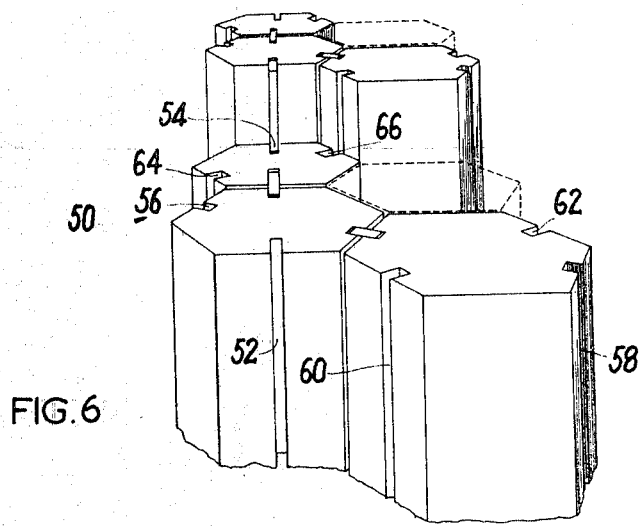
Figure 5:
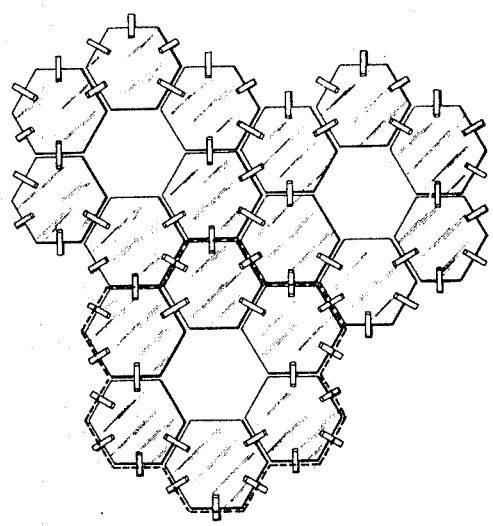
Figure 8:
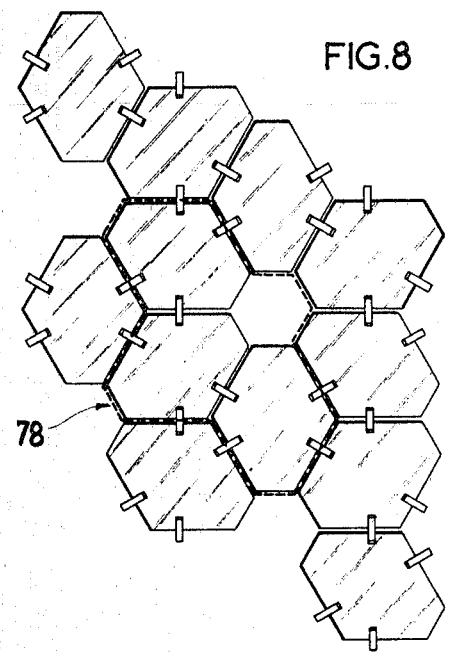
Figure 7:
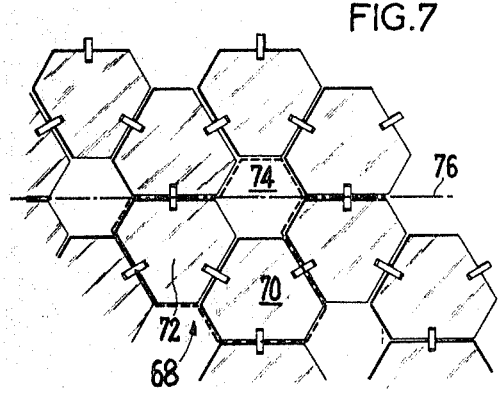
Figure 9:
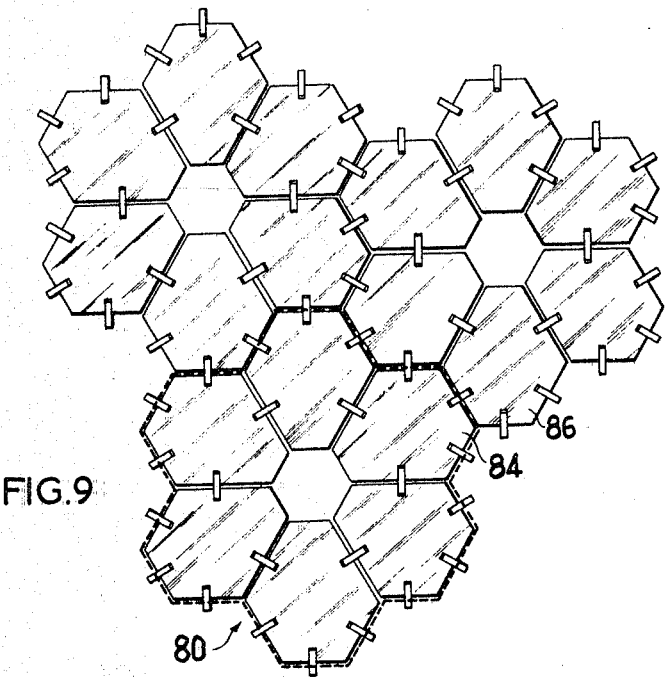
Figure 10:
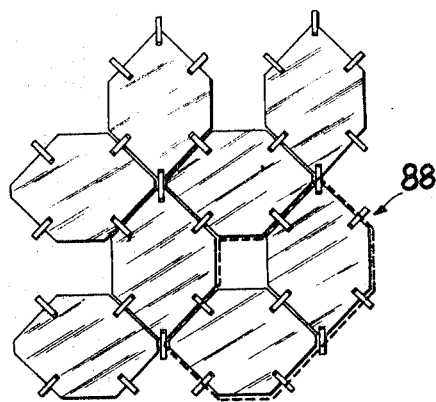
Figure 11:
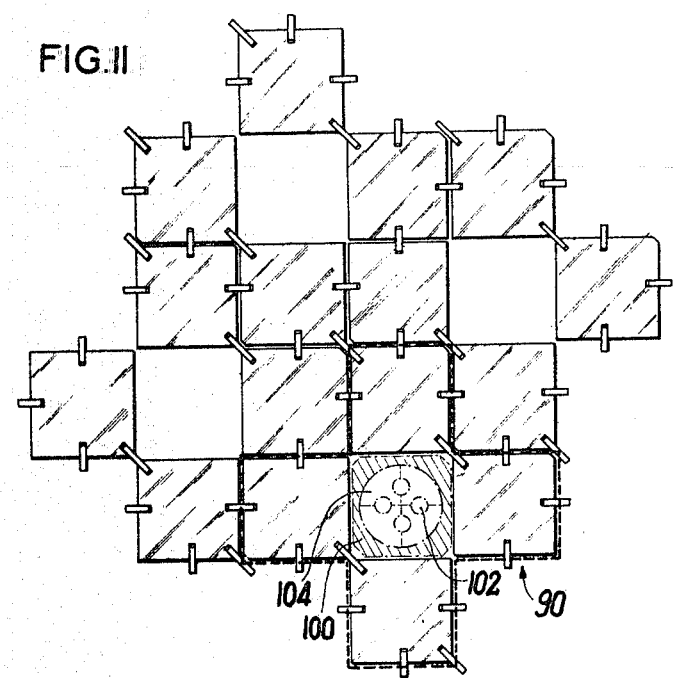
Figure 12:
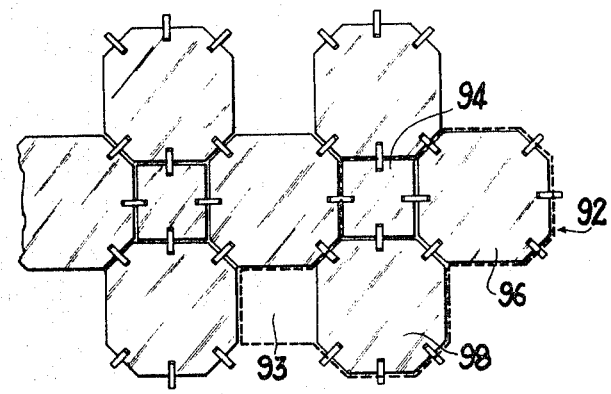
Figure 11A:
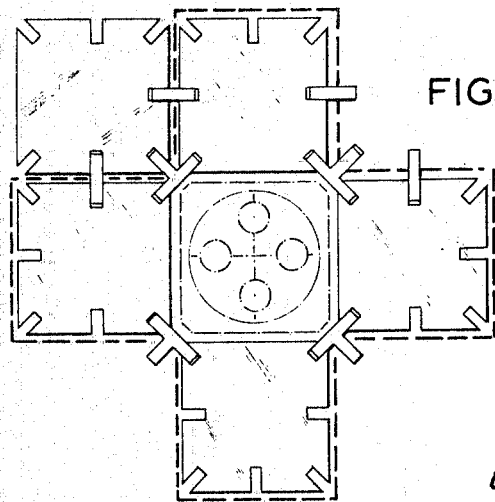
Figure 14B:
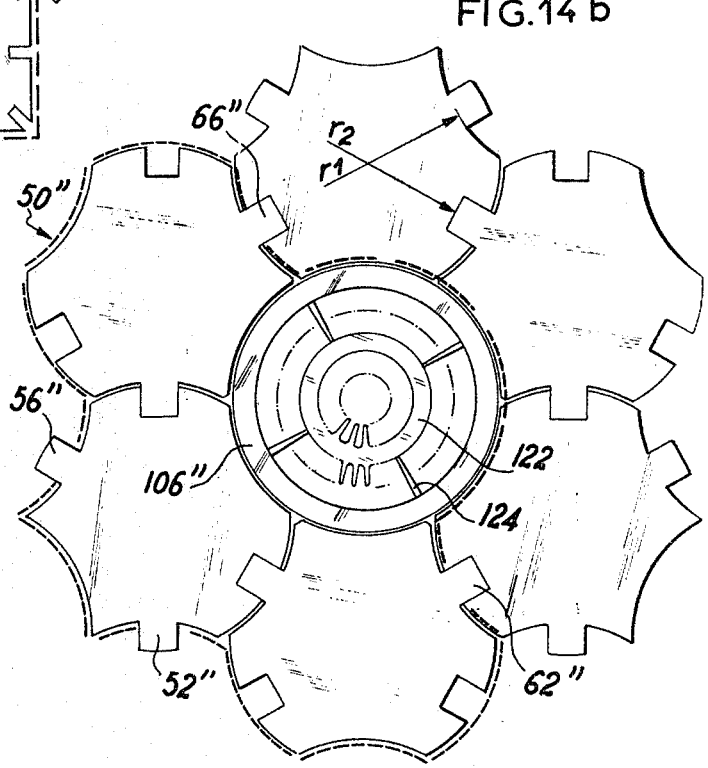
Figure 13:
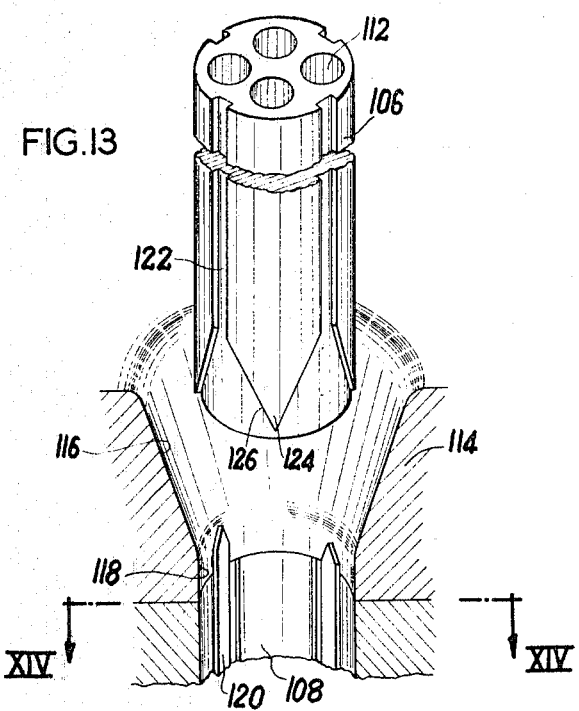
Figure 14:
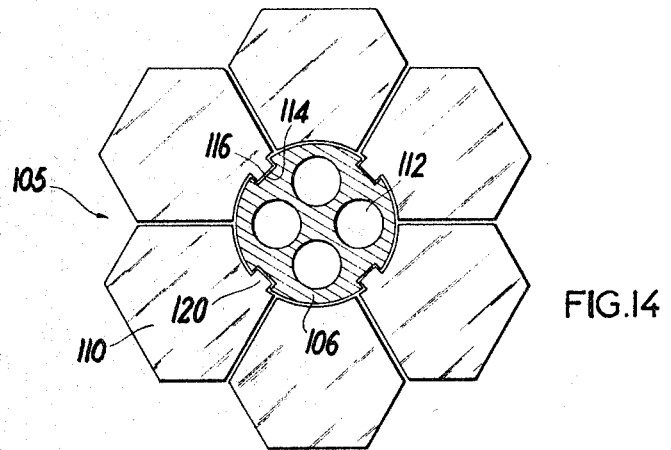

FIGURE 3, like FIGURE 1, is a detail of the structure of FIGURE 2 surrounded by chain dot lines;

FIGURES 4 and 5 illustrate other embodiments comprising bars and ducts of regular hexagonal cross-section;

FIGURE 6 is a partial view, in perspective, of the core structure shown in FIGURE 4;

FIGURES 7, 8 and 9 show schematically portions of structures according to other embodiments of the invention, in which the columns have irregular hexagonal cross-section and the ducts a regular hexagonal cross-section;

FIGURE 10 shows schematically a part of a structure according to a further embodiment of the invention, in which the columns have an irregular hexagonal cross-section and the ducts a square cross-section;

FIGURE 11 shows schematically a part of a structure according to another embodiment of the invention, in which the columns and the ducts have a square cross-section of the same order;

FIGURE 11a, similar to FIGURE 11, shows a modified embodiment making use of cruciform keys;

FIGURE 12 shows schematically a part of a structure according to another embodiment of the invention in which some columns have a square and some an octogonal cross-section and in which the ducts have a square cross-section;

FIGURE 13 shows schematically a sheath of a nuclear fuel element and the extremity of a duct in which it is mounted;

FIGURE 14 is a section along line XIV—XIV of FIGURE 13;

FIGURE 14b is similar to FIGURE 14 and illustrates modified embodiments in which the fuel element pattern is identical to that in FIGURE 4;

FIGURES 15 to 20, like FIGURE 14, show schematically various forms of columns and ducts.

Since FIGURES 1 to 20 illustrate (with the exceptions of FIGURES 6 and 13) right sections, it has been considered preferable herein for greater simplicity in the description and claims to use terms of plane geometry to qualify figures of volume. By way of example, "hexagonal column" means "column of right hexagonal section" etc.

FIGURE 1 shows a part of a core structure of from two to six columns formed by juxtapositioning identical elementary assemblies of solid moderator blocks and adjacent fuel receiving channel. Each of these assemblies, such as the assembly 22 surrounded by a broken line in FIGURE 1, comprises two regular hexagonal columns 24 and 26 of solid moderator blocks having generally vertical axes, coupled by a line of keys 28 and a duct 30 of shape homothetic with that of the columns. Duct 30 receives the fuel elements (not shown) and serves for circulation of cooling fluid. FIGURE 1 shows that the juxtaposition of assemblies fills the plane of right sections without spaces other than the play-between assemblies and between columns of a single assembly.

In practice, the active part of the core (formed by assemblies of moderator columns) is defined at its periphery by columns forming a reflector and the structure comprises, depending on whether these last columns are counted, a little more or a little less than $2n$ columns for $n$ ducts.

Each assembly of columns of moderator blocks is coupled to the columns of adjacent assemblies by lines of longitudinal keys located in planes passing through the axes of the two columns to be coupled, that is to say in the median planes of those of the lateral faces of its columns which face the columns of other assemblies. In the case of FIGURE 1, where the assemblies are formed of two columns and a duct, one face in two is keyed. The assembly 22 for example is coupled to the adjacent assemblies by four lines of keys 32, 34 and 38 providing two distinct directions of keying at 120°. These lines of keying can be according to one of the arrangements of Babule et al., Serial No. 846,080, filed October 13, 1959, and now Patent No. 3,157,582.

The use of two directions of the planes of keying produces two directions of cleavage at 120° between the assembly 22 and the adjacent assemblies. One of these planes of cleavage 40 is shown in chain dot line in FIGURE 1 where it is seen that the parts located on either side of the line 40 can be separated without breaking the keys by simply sliding these in the keyways of the columns.

The structure of FIGURE 1 comprises three directions of planes of cleavage corresponding to the three planes of the lateral faces of the columns. In effect, if one no longer considers as an elementary assembly the columns 24 and 26 and the duct 30 but considers the columns 24 and 42 and the duct 30 as an elementary assembly (which one can properly do since such an assembly fulfills the conditions set out above) one sees that the planes of keying between elementary assemblies are those of keys 28 and 34 and the directions of planes of cleavage are then those of the corresponding faces of the column 24.

In general, when the active part of the core comprises substantially twice as many columns as ducts, it is difficult for geometric reasons, to key together elementary assemblies in three distinct planes by simple means. It is clearly necessary to avoid cleaving the structure from side to side. The possibility of cleaving will be eliminated by using a reflector formed by adjacent hexagonal columns provided with lines of keying on all their lateral faces. This reflector will in turn be supported by a rigid frame or a series of pillars.

The use of a reflector pile encompassing the core proper and formed of adjacent hexagonal columns provided with lines of keys on all their lateral faces does not, however, prevent internal cleaving from side to side of the active core. Control of the reactor is, in general, provided by control rods movable parallel to the ducts occupied by the cells of fuel elements to cause them to penetrate the core to a greater or less degree. These control rods have a diameter much smaller than that of the cells of fuel elements and can therefore be mounted in ducts of much smaller dimensions which ducts can be formed along the axes of the columns.

The embodiment of the invention shown in FIGURES 2 and 3 provides supplementary columns receiving control rods to limit the length of the planes of internal cleavage. In this embodiment, a certain number of ducts, regularly arranged in the structure, are replaced by columns such as 44 provided with ducts such as 46 to receive control rods.

These columns are coupled on all their faces to surrounding columns by lines of keys such as 48 (FIGURE 3).

The length of the planes of cleavage is thus limited to the interval between two successive columns occupied by rods, that is to say to the product of the pitch $p$ of the lattice by the ratio of the number of ducts to the number of rods. This ratio cannot take any total value, if the lattice of the control rods is to be regular, but the number of possible combinations is sufficient for the use of the approximate number of control rods otherwise required. Supplementary rods may be superimposed on the regular lattice.

In the embodiment shown in FIGURES 2 and 3, one channel in seven is replaced by a bar. The control rods are then located in a triangular lattice whose orientation is displaced from that of the triangular lattice of the ducts by an angle $\alpha$ (FIGURE 2) given by the relation:

$$tg\alpha = \sqrt{\frac{3}{2}} p \frac{1}{2.5p} = \sqrt{\frac{3}{5}}$$

The pitch of the lattice of the bars P is then related to the pitch $p$ of the lattice of ducts by the relation:

$$P = 2.5p/\cos\alpha$$

A different density of control rods can be used and the lattice of bars and the lattice of ducts will be displaced. For a triangular lattice, the angle $\alpha$ and the pitch P have the following values:

$$tg\alpha = \sqrt{\frac{3}{2(1.5+n)p}}$$

$$P = \frac{(1.5+n)p}{\cos\alpha}$$

Where $n$ is a whole number, positive or zero, with the following values:

1/$n=0$ (one channel in three replaced by a bar)

$$tg\ \alpha = \sqrt{\frac{3}{3}} P = \frac{1.5p}{\cos\alpha}$$

2/$n=2$ (one channel in thirteen replaced by a bar)

$$tg\ \alpha = \sqrt{\frac{3}{7}} P = \frac{3.5p}{\cos\alpha}$$

3/$n=3$ (one channel in twenty-one replaced by a bar)

$$tg\ \alpha = \sqrt{\frac{3}{9}} P = \frac{4.6p}{\cos\alpha}$$

FIGURES 4 and 6 and FIGURE 5 show two embodiments in which columns and ducts both have hexagonal form, but in the first case the elementary assemblies comprise three columns for a duct and in the second case six columns for a duct. In the two cases, it is possible to verify easily that the elementary assemblies are keyed to the adjacent assemblies in three planes of keying. Thus, the elementary assembly 50 of FIGURES 4 or 6 (surrounded by a broken line in FIGURE 4) is coupled to the adjacent assemblies by lines of keys 52 and 54 disposed according to a first orientation, 56 and 58 disposed according to a second orientation at 120° from the former, and 60, 62, 64 and 66 disposed according to a third orientation at 120° to the first two. The lines of keys remain in the planes joining the axes of two columns which they unite.

The columns are formed by juxtapositioning bars end-to-end. To ensure alignment of superposed bars in a single column and to prevent their relative rotation, several constructions are possible as engaging the bars in one another, interpositioning coupling pieces, use of lines of keys to associate bars together with the same key engaging at least two consecutive bars, etc. The bars of all of the columns can be at the same levels to form beds or be displaced axially to provide the arrangement of FIGURE 6.

In the above examples the ducts and columns are of substantially identical form. For a given dimension of the ducts, the lattice pitch can have a very limited number of values. If $a$ is the length of the side of the hexagons which juxtaposed would fill the plane without play, the pitch $p$ will be equal to $3a$ in the example of FIGURE 1; to $2a\sqrt{3}$ in the example of FIGURE 4, etc. No intermediate value would be obtainable.

A simple way of solving the problem of obtaining intermediate values of the pitch $p$ comprises using bars of right irregular hexagonal cross-section, which modifies the relation of the total section of the ducts to the total section of the columns and the relation of the total volume of voids to the total volume of moderator.

In FIGURES 7, 8 and 9, there are schematically shown embodiments in which the columns are all identical but have a section of irregular hexagonal form, the section of the ducts remaining regular hexagonal.

In the embodiment of FIGURE 7, the elementary assemblies such as 68 comprise two columns 70 and 72 for a duct 74 and, as in the case of FIGURE 1, planes of cleavage, such as 76, are caused by only two orientations of keying planes between the adjacent elementary assemblies. Each column exhibits a symmetry of revolution of the 3rd order and the keys remain directed according to planes joining the axes of two columns which they unite.

The length of the planes of cleavage clearly can be limited by replacing certain ducts by supplementary columns, an arrangement similar to that shown in FIGURES 2 and 3.

In the embodiment of FIGURE 8, the elementary assemblies such as 78, surrounded by a broken line, comprise one duct for three columns. As in the case of FIGURES 4 and 5, this structure exhibits three distinct orientations of planes of keying between the elementary assemblies and within each assembly thus providing no planes of cleavage.

Each column has an axis of symmetry about which it exhibits a symmetry of the 2nd order. The lines of keys are directed according to the planes passing through the axes of the two columns which they join, which planes are not the diametric planes of the opposite faces.

In the embodiment of FIGURE 9, the elementary assemblies, such as 80, surrounded by a broken line, comprises a duct and six columns completely surrounding the duct. The right section of the duct remains regular hexagonal but that of the bars is no longer the centre of symmetry. The lines of keys must then be in directions joining axes passing through the geometric centres of gravity of the right sections of the bars to be joined.

A supplementary condition must be met to avoid the appearance of excessive stresses in the structure. The proportion between the maximal and minimal dimensions of the bars must not exceed a certain value. If this condition is not met, the keys coupling two columns of different assemblies such as columns 84 and 86, have an exaggerated angularity relative to the midplane of the faces, and such angularity would make manufacture difficult and would weaken the keying. Further, the expansion or contraction of the bars could result (by virtue of contact with the base) in movement of the bars and in displacement of the grooves which receive the keys, and create stresses in the keys and in the walls of the grooves.

Economic reasons lead to the adoption of a cross-section approximating a circle since the bar is generally machined from an extruded block of cylindrical shape. 3/2 may be considered as a practical limit for the proportion between the extreme radial dimensions. If the ratio exceeds this maximum, the drawbacks referred to above appear and are not balanced by any appreciable advantages.

In the embodiment of FIG. 10, the elementary assemblies, such as 88, surrounded by a broken line, each comprises a duct and two columns. The cross-section of the ducts is square while that of the bars is irregular hexagonal, but exhibits nevertheless a centre of symmetry. The pattern of ducts is of square pitch. The lines of keys coupling two bars are clearly in the plane which passes through the axes of symmetry of two coupled bars. These keys remain perpendicular to the faces, but are no longer contained in the median planes of the faces. The keys located at the peaks of the hexagons to couple the assemblies to adjacent assemblies provide the third orientation of the keying planes necessary to avoid cleavage of the structure.

There again, it is preferable not to exceed a relation of 3/2 between the maximal and minimal dimensions of the right sections of the bars.

The embodiment shown in FIGURE 11 uses elementary assemblies such as 90 surrounded by a broken line, formed by a duct and four columns, all square. The bars again have a section of the same order, slightly less than that of the duct due to the play provided.

The keys located in the median planes of the faces offer two orientations of keying. To provide a third orientation, keys are placed in the angles of the bars. For greater symmetry, cruciform keys could be used in the angles (FIG. 11a), but this structure has the disadvantage of complicated manufacture and the use of different keys according to their positions without presenting appreciable advantages.

The bars can be made with the same number of grooves and are identical and useful in any position.

In all of the foregoing embodiments, the columns can be made identical but this solution is not indispensible. For example, FIGURE 12 shows an embodiment where each elementary assembly, such as 92, surrounded by a broken line, comprises a square duct 93, a square bar 94 whose section is substantially identical to that of the duct and two octagonal bars 96 and 98 exhibiting a symmetry of revolution of the 4th order about their axes.

The median planes of the faces of the squares and octagonals offer four orientations of keying planes, it being preferable to use all for greater symmetry. In effect, all the keys remain of simple form and show none of the disadvantages of cruciform keys required to provide four planes of keying in the embodiment of FIGURE 11.

Whatever the embodiment considered, the adjacent columns defining a duct are in general assembled with sufficient play to allow deformations of the bar due to the Wigner effect. This play provides the cooling fluid with a path between ducts because the coupling keys, even when they extend the length of the columns, may not provide tightly sealed partitions. It is therefore preferable to locate the fuel elements in sheaths which, one on top of another in a duct, provide the required sealing of the duct.

By way of example, FIGURE 11 shows in an assembly 90 a cell of fuel elements (schematically shown in chain dot lines) formed by a sheath 100 in which is placed a cluster of four elements such as 102. The juxtapositioning of the sheaths in the duct defines a conduit 104 for circulation of cooling fluid.

The ducts which are in the assemblies of the embodiments so far described can receive cells of fuel elements in various arrangements. The use of the sheath for better sealing of the duct for cooling fluid flow is not indispensible, but is preferable.

In the embodiment which has just been described, the sheath has a polygonal exterior form. In most cases, it is preferable for reasons of manufacture to use a cylindrical annular sheath of constant thickness.

In the embodiment shown in FIGURES 13 and 14 each assembly such as 105 comprises a sheath 106 which lies in the duct 108 defined by six columns of right hexagonal section, such as 110, similar to the columns of the embodiment of FIGURE 9, and coupled to one another in a similar fashion by keys not shown. The essential difference between the columns of the two embodiments lies in the shape of the faces which define the ducts which are semi-cylindrical instead of planar in FIGS. 13 and 14.

In the example shown, the sheath 106 comprises four longitudinal bores such as 112 set regularly about its axis and adapted to receive four fuel elements or more generally four sets of fuel elements. Each of these elements is centered and retained in the corresponding bore by any suitable arrangement leaving a passage for flow of cooling fluid.

The cells provided with their fuel elements are located one after another in the duct 108 supporting one another (save where the channel is horizontal); they comprise guide and orientation means for each sheath to coincide respectively with those of the adjacent sheaths; thus four lines of fuel elements are located in four sub-ducts extending through the full thickness of the core.

In the example shown, the angular orientation of the sheaths in the duct is effected as follows: the metallic seating blocks such as 114 located at the upper part of the pile (in the case of a reactor with vertical ducts) comprise a conical recess 116 then a cylindrical recess 118 of the same diameter as the duct, to form a coarse guide for introducing sheaths into the duct. Certain columns such as 110 forming the duct 108 comprise longitudinal ribs such as 120 disposed at 90° to one another, as can be seen in FIGURE 14. These ribs extend into the cylindrical part 118 of the recess of block 114 where they end in points. The sheath 106 comprises four longitudinal grooves such as 122 of dimensions corresponding to those of the ribs and displaced angularly by 45° relative to the axes of the bores 112. These grooves widen at one of the ends of the sheath to form together the points such as 124.

The procedure for inserting the sheath 106 in the duct is as follows: first the conical recess 116 brings the sheath and duct coaxial (with a little play). The lower part of the sheath then penetrates the cylindrical recess 118, and the two axes are substantially aligned. If a point 124 of the sheath lies opposite a rib of the duct, the ramp 126 formed by the lateral wall of the widened part of the groove 122 turns the sheath until the point penetrates this groove. The sheath has only then to slide into the duct 108, guided and oriented by the ribs 120.

When the play between the sheath 106 and the duct 108 is large, it could happen that two consecutive points of the sheath come opposite two opposed faces of two points of consecutive ribs of the duct. In this case, rotary forces imposed on the sheath are of opposite hand and there could be "jamming." This risk can be avoided by ending the ribs 120 by points located at different levels, as shown in FIGURE 13.

In the present case the number of ribs is the same as the number of the grooves and that of the sub-ducts 12. Although this arrangement is not absolutely necessary to obtain the desired orientation, it is preferable since minimal rotation of the sheath is required and there are no empty longitudinal spaces which are detrimental from the neutronic point of view.

Referring now to FIG. 14b, there is shown a core structure adapted to receive fuel assemblies of circular cross-section, while retaining the basic pattern of FIG. 4, i.e., three moderator columns and one duct in each elementary assembly. For more clarity the same reference numerals have been used in FIG. 14b and in FIG. 4, with double prime marks affixed thereto in FIG. 14b.

The core illustrated in FIG. 14b consists of elementary assemblies such as 50′ or 50″ each comprising three columns and one duct, but the two sides of the hexagon which define fuel channels are part circular so that the channels are cylindrical.

In the embodiment of FIG. 14b, the bars have such a cross-section that a minimum of graphite is removed from the cylindrical blank from which the bar is machined, while retaining a circular cross-section for the channels. For this purpose the keys consist of ribs integral with respective bars and the sides are given an arcuate shape so designed that $r_1=r_2$ (see FIG. 14b).

The channels of the assemblies 50" of FIG. 14b locate fuel assemblies similar to that illustrated in FIG. 14a but simpler: each fuel structure still comprises a sheath or sleeve 106" of moderator material; but a single fuel element 122 is located in the bore of the sleeve 106"; the fuel element is axially centered by splitters or blades 124 and retained against axial movement by conventional means (not shown). The fuel element consists of an annular rod of fissile material internally and externally clad with metal sheaths formed with fins. The heat-carrying gas then flows along the channel inside the fuel element and in the passage between the outer sheath and the sleeve 106".

Figure 15:
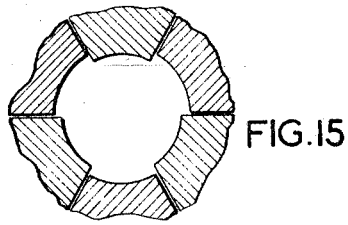
Figure 16:
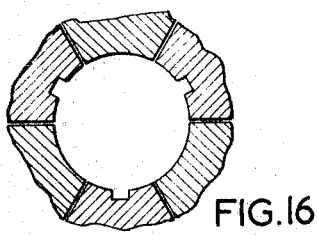
Figure 17:
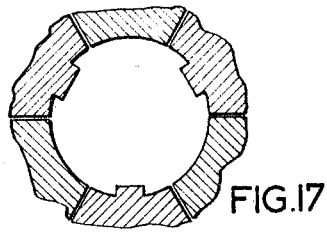
Figure 19:
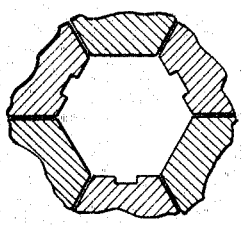
Figure 18:
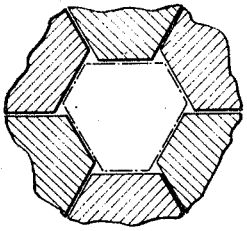
Figure 20:
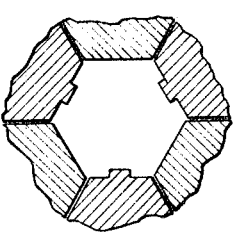

The arrangement of the guide means can be varied. FIGURES 15, 16 and 17 show possible arrangements for a cylindrical duct formed by six hexagonal columns and a sheath comprising 3n sub-ducts. FIGURES 18, 19 and 20 show arrangements for a hexagonal duct formed by six hexagonal columns and a hexagonal sheath comprising 3n sub-ducts. In all these figures, as well as FIGURE 14, the junction keys are not shown.

In the case where the section of the sheath is a regular polygon of $m$ sides and it comprises $a \times m$ sub-ducts (a whole member), it is needless to provide guide means along the length of the duct. It is sufficient to provide appropriate chamfers on the sheaths and on the bars placed at the head of the column.

When the sheaths are cylindrical, in certain cases orientation means can be provided only on the sheaths. For example, crossed teeth in the cylindrical crowns located at the foot and at the head of each sheath, either on the periphery, or on the central core. These means engage one another and orient the sheaths with respect to each other. If a particular orientation is required in the duct, it is sufficient to provide at that extremity of the duct an orienting arrangement for the sheath first introduced.

Although all of the embodiments shown correspond with vertical axis structures in which the coupling of the bars is effected by keys located parallel to the axis, the invention is not limited to this arrangement, which is however the arrangement at present preferred. The invention is equally applicable to reactors of horizontal axis or reactors of vertical axis in which coupling between bars is different.

Among the embodiments described, those which are generally of most interest are those formed by bars of regular polygonal section coupled by lines of keys disposed in three different planes of orientation. These embodiments, which correspond to Babule et al., Serial No. 846,080 and now Patent No. 3,157,582, referred to above, allow total compensation of Wigner effect and maintenance of constant play between all of the bars. The embodiments in which the bars are not maintained in the lattice by keys (embodiments of FIGURES 1 and 7) rely on friction between the bases of the columns and the base which supports them to ensure centering, but this solution does not exhibit the certitude of the preceding arrangement.

In general, it is to be understood that the scope of the present invention is not limited to the embodiments shown, but on the contrary covers all variants.

What we claim is:

1. A core structure for a nuclear reactor comprising a plurality of prismatic identical assemblies arranged parallel to a vertical direction and interfitted with adjacent assemblies in a cross-section transverse to said direction, each of said assemblies consisting of from two to six adjacent columns each column consisting of solid prismatic moderator blocks stacked in end to end relation, said columns having their axes parallel to said vertical direction, each of said assemblies including one nuclear fuel structure extending through said assembly parallel to said direction, passage means in said fuel structure for a fluid coolant parallel to said direction, keying means extending parallel to said direction connecting all of said columns, said prismatic assemblies being located in the core in the same angular position whereby each of said fuel structures is surrounded by solid moderator columns only.

2. A core structure as described in claim 1, wherein each of said blocks is maintained relative to said blocks in adjacent columns by longitudinal keying means.

3. A core structure as described in claim 2, said keying means comprising longitudinal keyways formed in said blocks, the longitudinal axis of a given one of said blocks lying in the longitudinal mid-plane of each of said keyways therein and keys engaging the lateral walls of said keyways with a sliding fit.

4. A core structure as described in claim 3, said keys being substantially rectangular in cross-section and each of said keys engaging a pair of keyways formed in the two of said blocks connected by said key, the axes of said two blocks lying in the mid-plane of said key.

5. A core structure as described in claim 3, said keys being located in corners of said blocks and being cruciform in cross-section, each of said keys engaging a number of keyways equal to the number of arms of the cruciform, each of said keyways being formed so that its mid-plane joints the axis of said block to said corner.

6. A core structure as described in claim 1, the proportion between the maximum and minimum sizes of the cross-section of each of said blocks being less than 3/2.

7. A core structure as described in claim 1, said blocks and said fuel assemblies having substantially identical regular polygonal cross-sections.

8. A core structure as described in claim 1, each fuel structure comprising a sleeve of moderator material of substantially circular cross-section including said passage means and fuel elements located in said passage means, said blocks adjacent to said structure forming a channel of substantially circular cross-section.

9. A core structure as described in claim 8 including cooperating guiding means on said sleeves and on said channels for angularly moving said sleeves into proper orientation upon insertion thereof in said channels.

10. A core structure as described in claim 9, said guiding means consisting of slots formed in said sleeve parallel to said vertical direction and ribs on the lateral surfaces of said blocks slidably engaging said slots, the number of said ribs being at least equal to the number of bores in said sleeve for fuel elements.

11. A core structure as described in claim 1, each of said blocks being connected to adjacent blocks by said keying means those of said assemblies located at the apices of a regular pattern having a pitch greater than the pitch of the overall assembly pattern and including an additional column of moderator material replacing a fuel structure located parallel to said direction and connected to the adjacent ones of said columns by said keying means located in at least three different angular directions.

12. A core structure as described in claim 1, each of said assemblies comprising three of said columns and said keying means connecting each of said assemblies with the adjacent ones of said assemblies in three different angular directions.

13. A core structure for a nuclear reactor comprising a plurality of prismatic identical assemblies arranged paralel to a vertical direction and interfitted with adjacent assemblies in a cross-section transverse to said direction, each of said assemblies consisting of three adjacent columns of solid moderator blocks stacked in end to end relation, said columns having their axes parallel to said vertical direction, each of said assemblies including one nuclear fuel structure extending through said assembly parallel to said direction, passage means in said fuel structure for a fluid coolant parallel to said direction, keying means extending parallel to said direction connecting all of said columns, each of said columns having two opposed part-cylindrical faces whereby said columns define cylindrical channels and each fuel structure having a circular cross-section, said prismatic assemblies being located in the core in the same angular position, wherein said keying means comprise ribs and grooves formed in said blocks parallel to said direction, the distance between the longitudinal axis of the blocks and the bottom of each groove being substantially equal to the distance between said axis and the base of each rib.

References Cited by the Examiner

UNITED STATES PATENTS 2,831,807　4/1958　McGarry _____ 176—81 X

FOREIGN PATENTS 1,214,246　11/1959　France.

OTHER REFERENCES

Directory of Nuclear Reactors, vol. 4, July 1962, p. 222.

CARL D. QUARFORTH, *Primary Examiner.*

BENJAMIN R. PADGETT, *Examiner.*

M. J. SCOLNICK, *Assistant Examiner.*